Sept. 23, 1924.
M. A. WHATLEY
EMERGENCY DRUM
Filed Nov. 27, 1923
1,509,385
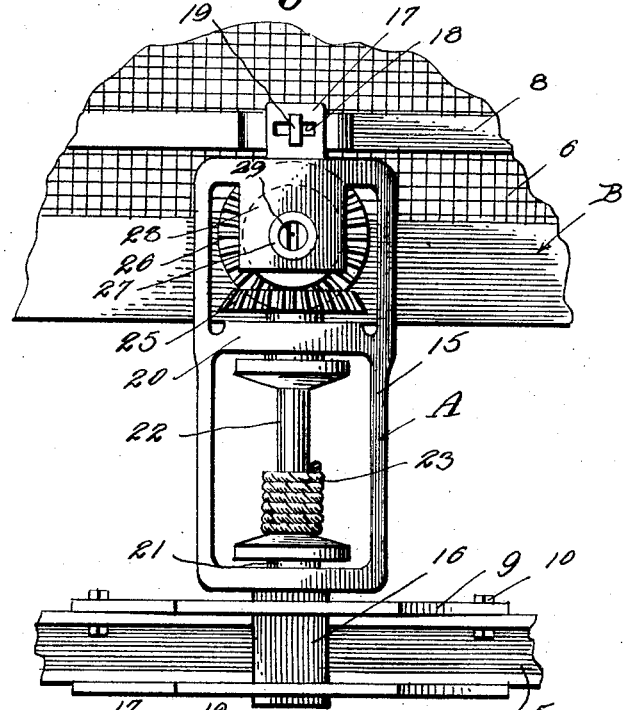
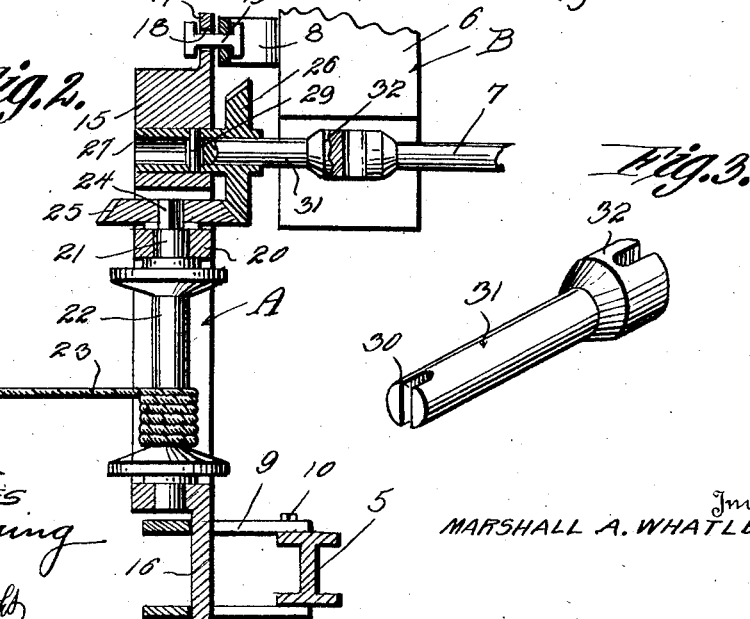
Inventor
MARSHALL A. WHATLEY
By Richard B. Owen
Attorney
WITNESSES Patented Sept. 23, 1924.

1,509,385

UNITED STATES PATENT OFFICE.

MARSHALL A. WHATLEY, OF REDWOOD, MISSISSIPPI.

EMERGENCY DRUM.

Application filed November 27, 1923. Serial No. 677,287.

*To all whom it may concern:*

Be it known that I, MARSHALL A. WHATLEY, a citizen of the United States, residing at Redwood, in the county of Warren and State of Mississippi, have invented certain new and useful Improvements in an Emergency Drum, of which the following is a specification.

This invention appertains to attachments for motor vehicles and the primary object of the invention is to provide a novel device for connection with an automobile for facilitating the pulling of an automobile out of the mud or the like, when the automobile becomes stalled on a roadway.

Another prime object of the invention is the provision of a frame carrying a winding drum for detachable connection with an automobile and novel means for connecting the drum with the crank shaft of the automobile, whereby the said drum can be driven from the engine of the automobile, the drum being adapted to wind up a pull cable thereon, which can be attached at one end to a suitable rigid support, such as a trunk of a tree or the like.

A still further object of the invention is to provide an improved device of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a front elevation of the improved emergency drum, showing the same attached to the forward portion of an automobile.

Figure 2 is a vertical longitudinal section through the improved emergency drum illustrating the connection thereof with an automobile, the automobile being shown in section, and Figure 3 is a detail perspective view of the shank for operatively connecting the crank shaft of the engine with the winding drum.

Referring to the drawings in detail, wherein similar reference characters designate corresponding parts throughout the several views, the letter A generally indicates the improved automobile attachment and B an automobile with which the same is associated.

The automobile B can be of any preferred character or type, and as shown embodies the front dead axle 5, the radiator 6, and the crank shaft 7 of the engine (not shown). As clearly shown in Figures 1 and 2 a transversely extending supporting bar 8 is placed across the front of the radiator 6 for forming means for holding the attachment A in place, as will be hereinafter more fully described.

The dead axle 5 also supports a pair of superimposed U-shaped holding clamps 9, which are bolted or otherwise secured as at 10 to the axle. The clamps 9 project forwardly from the axle and arranged substantially below the central portion of the supporting bar 8.

The improved attachment A comprises an open frame 15 having a depending ear 16, which is adapted to be placed in the U-shaped clamping members or supports 9. The upper end of the frame 15 also supports a slotted ear 17, which is adapted to be disposed in abutting relation to the bar 8. The bar 8 at its central portion and the ear 17 are provided with aligned slots 18, through which is adapted to be positioned a double-headed holding key or pin 19.

The open frame 15 at a point equidistant its ends is provided with a transversely extending bar 20, the purpose of which will now be described. The bar 20 and the lower end of the frame 15 are provided with aligned bearing openings through which extend the terminals of the driven shaft 21. The driven shaft 21 has keyed or otherwise secured the winding drum 22, on which is adapted to be wound the pulling cable 23. The shaft 21 extends through the bar 20 and is provided with a polygonal extension 24 on which is affixed a beveled gear 25. This beveled gear 25 meshes with a second beveled gear 26, keyed or formed on a hollow hub 27. The hub 27 is rotatably mounted in a suitable bearing 28 carried by the top bar of the open frame 15. By referring to Figure 2 of the drawing, it can be seen that the hollow hub 27 supports a diametrically extending pin 29, which is adapted to be engaged by the slotted end 30 of the connecting shaft or shank 31. The inner end of the connecting shaft 31 is provided with an enlarged slotted head 32 for engaging the forward end of the crank shaft 7.

In use of the improved device, when the automobile becomes stalled in the mud or the like on the roadway, the attachment A is placed in position by first inserting the lug 16 in the clamp 9 and then swinging the frame 15 into a vertical plane until the lug 17 comes into contact with the bar 8. The key 18 is then inserted in place which will hold the frame in position against movement. Prior to the swinging of the frame in position or during the swinging thereof, the drive shaft or shank 31 is placed in engagement with the pin 29 and then into engagement with the forward end of the crank shaft 7.

The cable 23 is then attached at its forward end to a rigid support such as a tree or the like and the engine is started. The rotation of the crank shaft 7 will in turn rotate the drum 22 and thus wind up the cable 23 thereon and thus effectively pull the machine from out of the mud.

From the foregoing description, it can be seen that I have provided an exceptionally simple and durable device which will facilitate the pulling of an automobile from out of the mud when the same becomes stuck in bad roadways.

Changes in details may be made without departing from the spirit or the scope of this invention.

What I claim as new is:

The combination with a motor vehicle including a crank shaft, a radiator and a dead axle, a transversely extending supporting bar disposed across the radiator, superimposed U-shaped clamps connected with the dead axle, of means for facilitating the pulling of the automobile out of the mud or the like when the same becomes stuck on a roadway including a frame, a depending ear formed on the frame arranged to be placed in said clamps connected with the dead axle, an ear formed on the upper end of the frame adapted to engage the supporting bar, a key for detachably connecting the ear formed on the upper end of the frame with the bar, a vertical driven shaft rotatably carried by the frame, a drum connected with the driven shaft, a horizontally arranged drive shaft carried by the frame, means operatively connecting the drive and driven shaft together, and a connecting shank detachably connected with the drive shaft and with the crank shaft of the engine.

In testimony whereof I affix my signature in presence of two witnesses.

MARSHALL $\overset{\text{his}}{\times}$ A. WHATLEY.
mark

Witnesses:
R. M. KELLY,
J. W. TUCKER.